United States Patent [19]

McDowell

[11] 3,925,896

[45] Dec. 16, 1975

[54] METHOD AND APPARATUS FOR ENCODING DENTAL WORK

[76] Inventor: James A. McDowell, 7025 E. McDowell Road, Scottsdale, Ariz. 85257

[22] Filed: Sept. 12, 1974

[21] Appl. No.: 505,585

[52] U.S. Cl. .................................. 32/40 R; 101/368
[51] Int. Cl.² .......................................... A22C 11/08
[58] Field of Search ............. 32/71, 40 R, 1; 40/2.2; 101/368

[56] References Cited
UNITED STATES PATENTS
960,544    6/1910    Harris ................................ 101/368

*Primary Examiner*—Robert Peshock
*Attorney, Agent, or Firm*—Cahill, Sutton & Thomas

[57] ABSTRACT

Method and apparatus are disclosed for providing identification on the dental work in a human mouth. The tool includes a plurality of tines arranged in a predetermined pattern; each tine permitting the indentation in the dental work of an index point. The tool also includes a plurality of digit indicators each secured to a tine and each positioned on a radial extending from the index point. The positioning of each digit indicator is determined by superimposing a two dimensional coordinate system over the index point and dividing the coordinate system into quadrants. Each quadrant includes a plurality of equally spaced radials each one representing a different decimal digit. The digit indicators simultaneously imprint or indent the dental work with the index points such that the resulting pattern left on the dental work is a code comprising a plurality of decimal digits representing the dental operator or dentist.

6 Claims, 7 Drawing Figures

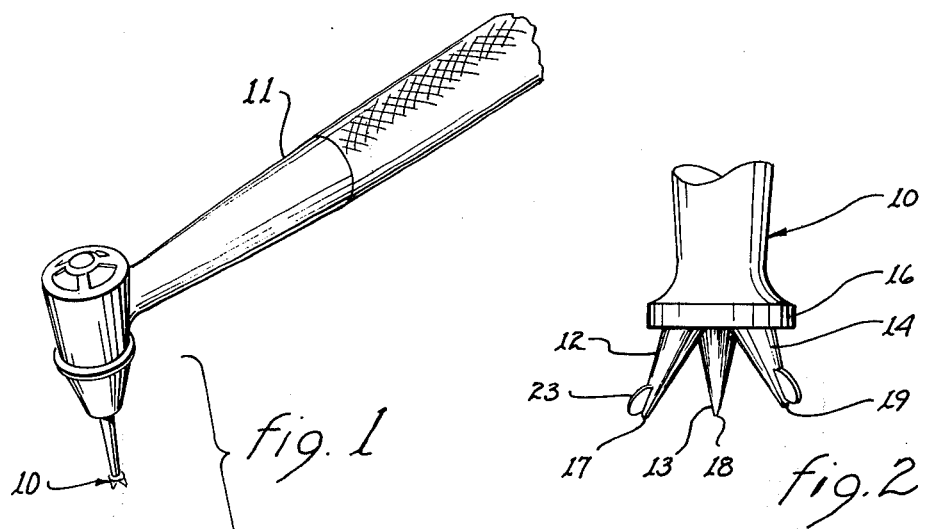
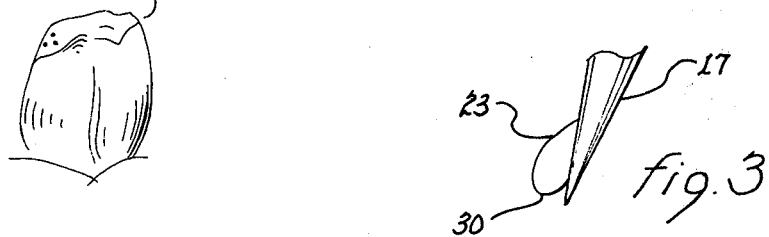
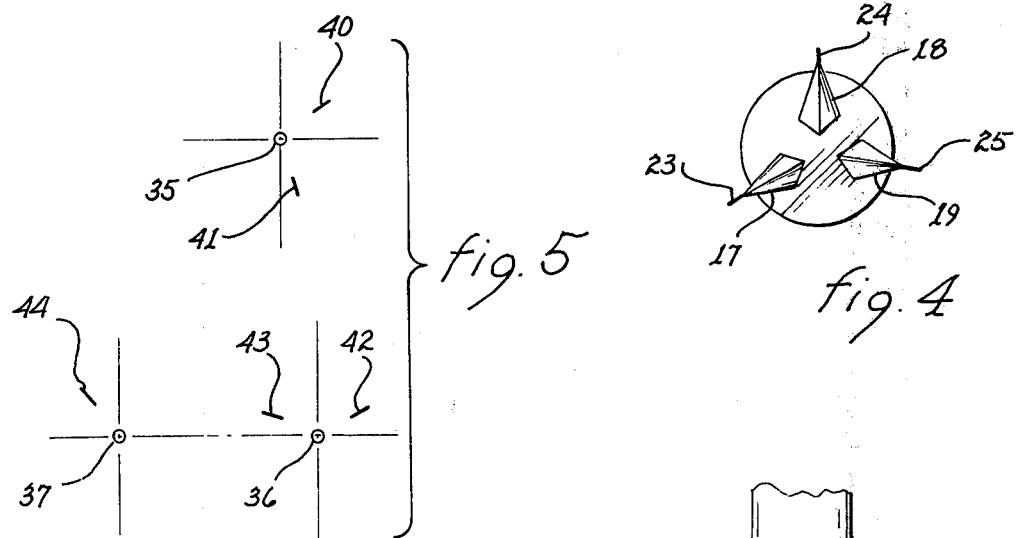
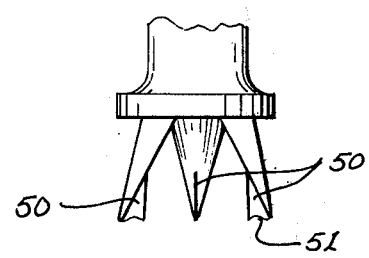

METHOD AND APPARATUS FOR ENCODING DENTAL WORK

The present invention pertains to a method and apparatus for encoding dental work and more particularly, for providing a means to identify the individual whose dental work is encoded.

The mobility of the present population has presented substantial difficulties to the identification of missing persons. Presently, the identification of an individual by means of fingerprints is usually impossible unless the person being identified has a criminal record accessible by the investigator. In many instances where the individual is deceased, and no records are available, such as an accident victim who has perished in a fire, resort is made to dental records in an attempt to identify the person. Obviously, identification by dental records is a hopeless task unless the investigator is already generally aware of the person's identity and merely wants positive proof of that identity.

It is therefore an object of the present invention to provide a method for encoding dental work to permit identification of an individual.

It is another object of the present invention to provide a method for encoding dental work that may readily be decoded and conveniently and inexpensively implemented.

It is still another object of the present invention to provide apparatus for conveniently imprinting a code in the dental work of a human being.

These and other objects of the present invention will become apparent to those skilled in the art as the description thereof proceeds.

The present invention may be understood with more specificity and clarity with reference to the following figures, in which:

FIG. 1 is a perspective view of a dental hand tool showing the apparatus of the present invention secured thereto.

FIG. 2 is an enlarged view of the tip of the toop of FIG. 1.

FIG. 3 is a side elevational view, slightly enlarged, of one of the tines of FIG. 2.

FIG. 4 is a bottom view of that portion of the tool shown in FIG. 2.

FIG. 5 is a schematic view of a code pattern useful in explaining the apparatus and method of the present invention.

FIG. 7 is a side elevational view of a modified digit indicator for use in the apparatus of the present invention.

Figure 6:
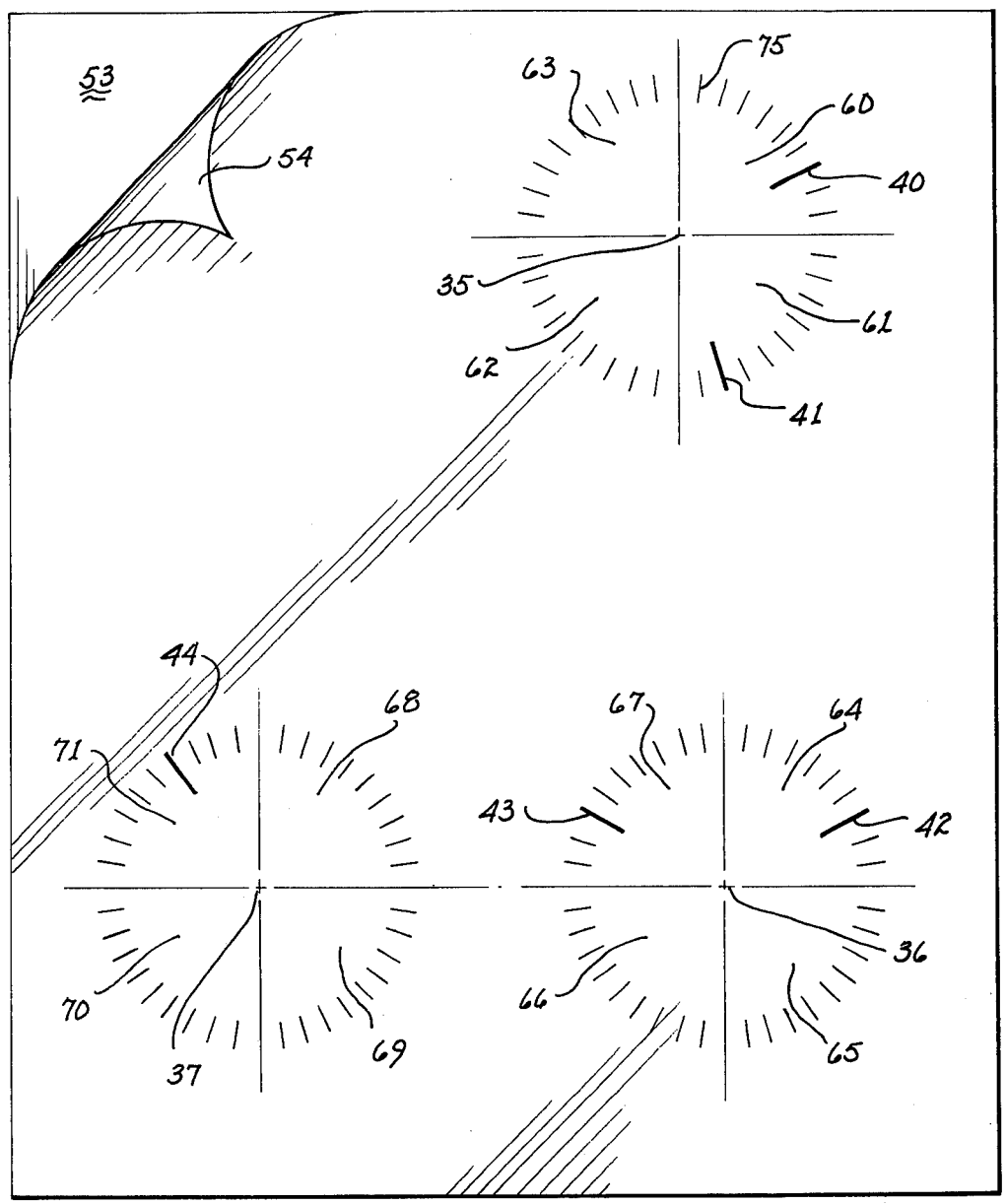
FIG. 6 is an enlarged view of FIG. 5 showing the use of an overlay in the decoding of the code imprinted in accordance with the method of the present invention and with the apparatus of the present invention.

The method of the present invention contemplates the utilization of a unique code assigned not to the individual in whose mouth the code is placed but rather assigned to the dentist or oral surgeon. This unique number may be, for example, the individuals Social Security Number. Upon ascertaining this unique number, the dentist may readily be located and the dental records of the patient obtained. Using this technique, the difficulty of imprinting numerous codes by a single dentist is overcome and the method and apparatus for encoding is simplified.

Referring now to the drawings, the present apparatus comprises a tool shown generally at 10 that may be affixed to a handpiece 11 or any other convenient holder. The tool includes a plurality of tines 12, 13 and 14, each tine extending from a base 16 and terminating in points 17, 18 and 19, respectively.

The tines 17–19, in plan view (FIG. 4) are positioned in a predetermined manner as will be described more fully hereinafter. Each of the tines includes one or more digit indicators such as those shown in 23, 24 and 25. The digit indicators may take a variety of forms; however, in the embodiment shown in FIGS. 1–4, each digit indicator includes an indentation producing edge such as that shown at 30, the purposes of which will become apparent as the description hereof proceeds.

The points 17, 18 and 19 of the tines are used to form an imprint, by indentation, in the dental work of a patient. The imprint may be placed on any suitable filling surface (a non-biting surface to prevent wear of the imprint). The points when used to form such an imprint by indentation in the dental work provide a predetermined pattern of index points; for example, FIG. 5 illustrates a typical predetermined pattern showing index points 35, 36 and 37. Since the tines 17, 18 and 19 are fixed with respect to each other, the pattern such as that shown in FIG. 5 will always be capable of being oriented so that one index point, such as index point 35, will be recognized as the top of the pattern. This predetermined pattern may, of course, take various forms; however, a pattern such as that shown in FIG. 5 seems convenient and is formed of a triangle having one side obviously shorter than the other sides so that the base of the triangle may readily be recognizable.

As described above, each of the tines 17-19 may be one or more digit indicators such as that shown at 23 secured thereto in a position close to the respective point of the tines so that the corresponding indentation producing edge, such as that shown at 30, will also form an imprint in the dental work adjacent the corresponding index point. In the embodiment shown in FIGS. 1–4, only one digit indicator is shown per tine. To more clearly illustrate the method and apparatus of the present invention, FIG. 5 illustrates a pattern wherein two of the tines (those forming index points 35 and 36) each have two digit indicators to form digit indications 40, 41, 42 and 43, repectively, while the tine forming index point 37 has a single digit indicator to form digit indicator 44.

As stated previously, the indentations are formed in the dental work such as in non-biting surface of a filling; the indentations are produced by forcing the tool 10 into the deformable surface of the filling, thus resulting in each of the points such as 17, 18 and 19, together with each indentation producing edge such as 30 contacting the filling surface and being forced thereagainst to provide a permanent pattern. There are numerous holders or handpieces such as that shown at 11 in FIG. 1 to hold the tool 10; for example, it may be desirable to utilize conventional impact type handpieces that would conveniently provide sufficient force to cause the tines and digit indicators to impress the pattern in the dental work. The tines should be closely spaced so that the resulting pattern is small enough to be placed on the small surfaces available to receive such patterns found in the dental work in the average patient. The utilization of a triangular pattern provides a convenient means to imprint the pattern when the surface upon which it is imprinted is not flat; further, the utilization of digit indicators secured to the tines with indentation producing edges readily provides the required indentations when the surfaces are uneven (concave or convex). There are numerous forms of indentation producing edges such as that shown at 30 that may be used to form digit indications. For example, the digit indicators 50 of FIG. 7 are formed with indentation producing edges 51 that will produce an indentation of slightly different form than that of the digit indicator 23 but which under some circumstances may be more convenient to use when the surfaces upon which the pattern is being imprinted is irregular and not flat.

Once the pattern is placed in the dental work of the patient, the code represented thereby may readily be ascertained by photographing and enlarging (by well known techniques) the pattern and placing an overlay over the enlarged photograph. Thus, a pattern such as that shown in FIG. 5 would be photographed and enlarged and an overlay placed on the pattern such as shown in FIG. 6. Referring now to FIG. 6, the enlarged photograph 53 with the overlay, includes index points that are placed directly over the index points 35, 36 and 37. Each of the index points on the overlay has a two dimensional coordinate system superimposed thereon with the coordinate system divided into quadrants. Thus, index point 35, with its coordinate system is divided into quadrants 60-63 while index point 36 has its coordinate system divided into quadrants 64-67 and index point 37 has its coordinate system divided into quadrants 68-71. Each of the quadrants 60-71 is provided with a plurality of radially extending lines 75, each representing a numerical digit from zero to nine, therefore, each digit indication positioned on one of the radial lines represents a decimal digit. For example, referring to the index point 35 in FIG. 6, it may be seen that the digit indication 40 in quadrant 60 coincides with the seventh radial in that quadrant which would therefor represent the decimal digit 7. Using the same technique for the remainder of the digit indications of the pattern shown in FIG. 6 and reading clockwise beginning with the index point 35, the pattern may be decoded into the decimal numbers 7, 8, 7, 3, 6. It will be obvious that a greater or lesser number of digits may be utilized and that the digits may be grouped according to the index points. For example, the above number may be decoded into 78-73-6.

If the code to be utilized by the respective dentists and oral surgeons is to coincide with the Social Security Numbers a pattern utilizing three index points will accommodate all such Social Security Numbers.

It may be seen that the method and apparatus of the present invention provide an inexpensive technique for identification of individuals through their respective dental records without the use of elaborate coding techniques that are unique to each individual; rather, an inexpensive tool is used and a method is employed that provides identification of the individual through the dental records in the possession of a dentist or oral surgeon whose unique code is placed on the dental work.

The method and apparatus of the present invention may also be used in a similar manner for identification of other objects such as jewelry (small surfaces), bone implants, prosthetic devices and the like.

I claim:

1. Apparatus for encoding information on dental work comprising: a base member, a plurality of tines extending from said base member and arranged in a predetermined pattern, each tine terminating in a point for forming an index point; a plurality of digit indicators each positioned on one of said tines adjacent the point of said tine, each digit indicator positioned on a radial extending from said point.

2. A method for encoding information on dental work comprising the steps:
   a. imprinting by indentation of said dental work a plurality of said dental points arranged in a predetermined pattern;
   b. simultaneously imprinting, by indentation in said dental work, a plurality of digit indications each positioned on a different predetermined radial extending from one of said index points in a predetermined quadrant about said one of said index points.

3. The method set forth in claim 2 wherein said plurality of index points are three index points arranged in a triangular pattern having one side shorter than the other two sides.

4. The method set forth in claim 3 wherein said digit indications are each positioned on one of ten radials, said radials dividing said predetermined quadrant.

5. The method set forth in claim 4 wherein said radials are equally spaced.

6. A method for encoding information on dental work comprising imprinting by indentations in said dental work, a plurality of index points arranged in a predetermined pattern, each index point forming the origin of a two dimensional coordinate system divided into quadrants, each quadrant divided into a predetermined number of equally spaced radials, each radial representing a different decimal digit; simultaneously imprinting by indentation in said dental work a plurality of digit indications each positioned on a different one of said radials.

* * * * *